United States Patent
Prinzing (10) Patent No.: US 6,592,628 B1
(45) Date of Patent: Jul. 15, 2003

(54) MODULAR STORAGE METHOD AND APPARATUS FOR USE WITH SOFTWARE APPLICATIONS

(75) Inventor: Timothy N. Prinzing, Capitola, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/255,643

(22) Filed: Feb. 23, 1999

(51) Int. Cl.$^7$ .............................................. G06F 17/30
(52) U.S. Cl. ...................... 715/522; 715/500; 715/513; 715/515
(58) Field of Search ................................ 707/513, 500; 715/513, 500, 501.1, 515, 522

(56) References Cited

U.S. PATENT DOCUMENTS

| | | | |
|---|---|---|---|
| 5,276,793 A | | 1/1994 | Borgendale et al. ........ 395/148 |
| 5,398,312 A | | 3/1995 | Hoffmann .................... 395/156 |
| 5,459,827 A | | 10/1995 | Allouche et al. ........... 395/148 |
| 5,479,596 A | | 12/1995 | Capps et al. ................ 395/148 |
| 5,530,796 A | | 6/1996 | Wang .......................... 395/156 |
| 5,765,177 A | * | 6/1998 | Nakatsuyama et al. ..... 707/514 |
| 5,787,449 A | * | 7/1998 | Vulpe et al. ................. 707/513 |
| 5,860,073 A | | 1/1999 | Ferrel et al. ................. 707/522 |
| 5,862,395 A | | 1/1999 | Bier ....................... 395/800.01 |
| 6,006,242 A | * | 12/1999 | Poole et al. ................. 707/531 |
| 6,016,492 A | | 1/2000 | Saxton et al. ............... 707/100 |
| 6,185,591 B1 | | 2/2001 | Baker et al. ................. 707/531 |
| 6,225,996 B1 | * | 5/2001 | Gibb et al. .................. 345/784 |
| 6,247,032 B1 | | 6/2001 | Bernardo et al. ........... 707/530 |
| 6,253,217 B1 | * | 6/2001 | Dourish et al. ............. 707/500 |
| 6,308,179 B1 | * | 10/2001 | Petersen et al. ............ 707/102 |
| 6,324,551 B1 | * | 11/2001 | Lamping et al. ............ 707/500 |

* cited by examiner

*Primary Examiner*—Heather R. Herndon
*Assistant Examiner*—Charles A Bieneman
(74) *Attorney, Agent, or Firm*—Finnegan, Henderson, Farabow, Garrett & Dunner, L.L.P.

(57) ABSTRACT

A method and system is provided that processes the content of a document separately from information used to describe the structure of the content in the document. Content can be text, alphanumeric data, or any other information contained in a document. Initially, the method provides a content entity capable of storing and manipulating the content stored in a storage area. The manipulation of content in the storage area includes inserting content in the content entity identified by a start position and a stop position, removing content from the content entity, and retrieving content from the storage area. A separate document entity is provided that uses element entities to represent the structure of the text without the content. The document entity is used to retrieve information from the element entities and determine the location of content in the content entity. The information retrieved from the element entities is used to manipulate the content stored in the storage area associated with the content entity.

12 Claims, 5 Drawing Sheets

MODULAR STORAGE METHOD AND APPARATUS FOR USE WITH SOFTWARE APPLICATIONS

RELATED APPLICATIONS

The following identified U.S. patent applications are relied upon and are incorporated by reference in their entirety in this application.

Provisional U.S. Patent Application No. 60/075,975, entitled "METHOD AND APPARATUS FOR USER INTERFACE WITH PLUGGABLE LOOK AND FEEL," filed on Feb. 24, 1998.

U.S. patent application Ser. No. 09/255,657, entitled "METHOD AND APPARATUS FOR AN EXTENSIBLE EDITOR," filed on the same date herewith.

U.S. patent application Ser. No. 09/255,654, entitled "METHOD AND APPARATUS FOR GENERATING TEXT COMPONENTS USED IN AN EDITOR," filed on the same date herewith.

U.S. patent application Ser. No. 08/885,614/P2390 filed Jun. 30, 1997, assigned to the assignee of the present invention and entitled "METHOD AND APPARATUS FOR GENERATING A GRAPHICAL USER INTERFACE," by Timothy N. Prinzing.

BACKGROUND OF THE INVENTION

1. Field of the Invention

This invention generally relates to software applications and, more particularly, to a modular storage method and apparatus for use with software applications.

2. Description of the Related Art

Increasingly, software applications must run on a variety of data processing systems ranging from small handheld devices to powerful workstations. In most cases the software applications must be modified to run on each computer system. Some modifications may only require recompiling the software for a target computer system. Other modifications need to take into account physical characteristics of the computer system such as limited disk storage, processor power, or memory capacity. For example, a small handheld device with limited disk storage may have difficulty storing the contents of large documents used by a particular software application. To address this limitation, the storage methods used in the software application must be modified to accommodate storing the content of large documents on devices with small storage capacities.

In conventional software applications, however, it is often not possible to replace a method of storing the contents of a document without rewriting a significant portion of the software application. These conventional software applications store content and organize the structure of the content using an integrated software module. That is, a software method that processes content such as text also often processes the structural information that describes how the text is organized. Structural information, for example, includes formatting codes and instructions that organize a document into paragraphs, sentences, words, and characters. This integration of content storage and structural organization of a document makes it difficult to replace content storage routines without affecting other portions of the software application.

As a result, there is a tension between developing new methods for storing content in an application and reusing code. Instead of having several methods for storing content, the software developers will create a new version of software for each computer system. These additional versions increase the development costs, increase the costs of customer service, and increase software maintenance.

Users with different computer systems may also have problems using a software application available in different versions. In such instances, users may have to learn to operate different versions of the same software for each of their different computer systems. Customers may also have difficulty moving data and documents between computer systems running different versions of the same software application. For example, content stored using different versions of the same software may not be compatible.

To address these limitations, it would be desirable to replace the content storage methods of an application without modifying other portions of the software application. This would facilitate replacing a method of storing content in a software application without changing the method used to structure the content. This would promote increased software reuse and decrease software development costs.

SUMMARY OF THE INVENTION

In accordance with methods and systems consistent with the present invention, a method is provided that processes storing content of a document separately from processing the information used to describe the structure of the content. Content can be text, alphanumeric data, graphical data or any other information contained in a document. A layout operation uses information reflecting the structure of the content of a document such as paragraphs, sentences, and characters.

Such a method and system provide a content entity capable of storing and manipulating content stored in a storage area. The manipulation of content in the storage area includes inserting content in the content entity, removing content from the content entity, and retrieving content from the content entity. A separate document entity is provided that uses element entities to represent the structure of the text without the content of the text. The document entity retrieves information from the element entities to determine the location of content in the content entity. The information retrieved from the element entities is used to manipulate the content stored in the storage area associated with the content entity. Entities can be implemented in procedural software programming languages or object-oriented programming languages.

In accordance with another aspect of the present invention, a method is provided capable of replacing a content entity used to store content in a document. A software application loaded into a data processing system has a default content entity for storing content in a document. The method determines if the default content entity or a new content entity should be used based on the storage capacities of the data processing system. This determination is made by comparing the storage capacity of the system with the storage characteristics provided by the default content entity and other content entities. Based on a result of this determination, the software application may replace the default content entity with a new content entity. Upon execution, the software application uses a document entity to provide the structure of content in the document and the new content entity to provide the content associated with the document. entity and other content entities. Based on a result of this determination, the software application may replace the default content entity with a new content entity. Upon execution, the software application uses a document entity to provide the structure of content in the document and the new content entity to provide the content associated with the document.

BRIEF DESCRIPTION OF THE DRAWINGS

The accompanying drawings, which are incorporated in and constitute a part of this specification, illustrate an implementation of the invention and, together with the description, serve to explain the principles of the invention.

In the drawings.

DETAILED DESCRIPTION

Overview

Implementations consistent with the present invention facilitate processing the storage of content of a document separately from processing associated with information reflecting a structure of content. A content entity facilitates the storage of content while a document entity facilitates representing the structure of the document. The document can be a text document, a spreadsheet, or any other data set used by an application. The content entity stores content in a storage area and provides commands to manipulate the content. The document entity uses element entities that represent the structure of the document and reference the content stored by the content entity. In a text editor, for example, element entities can represent combinations of paragraphs, sentences, and characters.

By replacing the storage methods in a software application, data processing systems with different storage capacities can run the same application and access the same information. For example, a software application running on a mainframe may be able to load an application and all the data associated with the application on a single disk drive. The mainframe would use a content entity that loads the content on a single disk drive and then use a separate document entity to determine the structure of the content. On a palm top computer system with limited storage, the same document entity would determine the structure of the content but a different content entity would be used to store the content. Rather than store all the information on a single disk drive, the content entity used by the palm top computer system may compress the information or may access the information as needed in small increments over a network such as the Internet.

System Architecture

Figure 1:
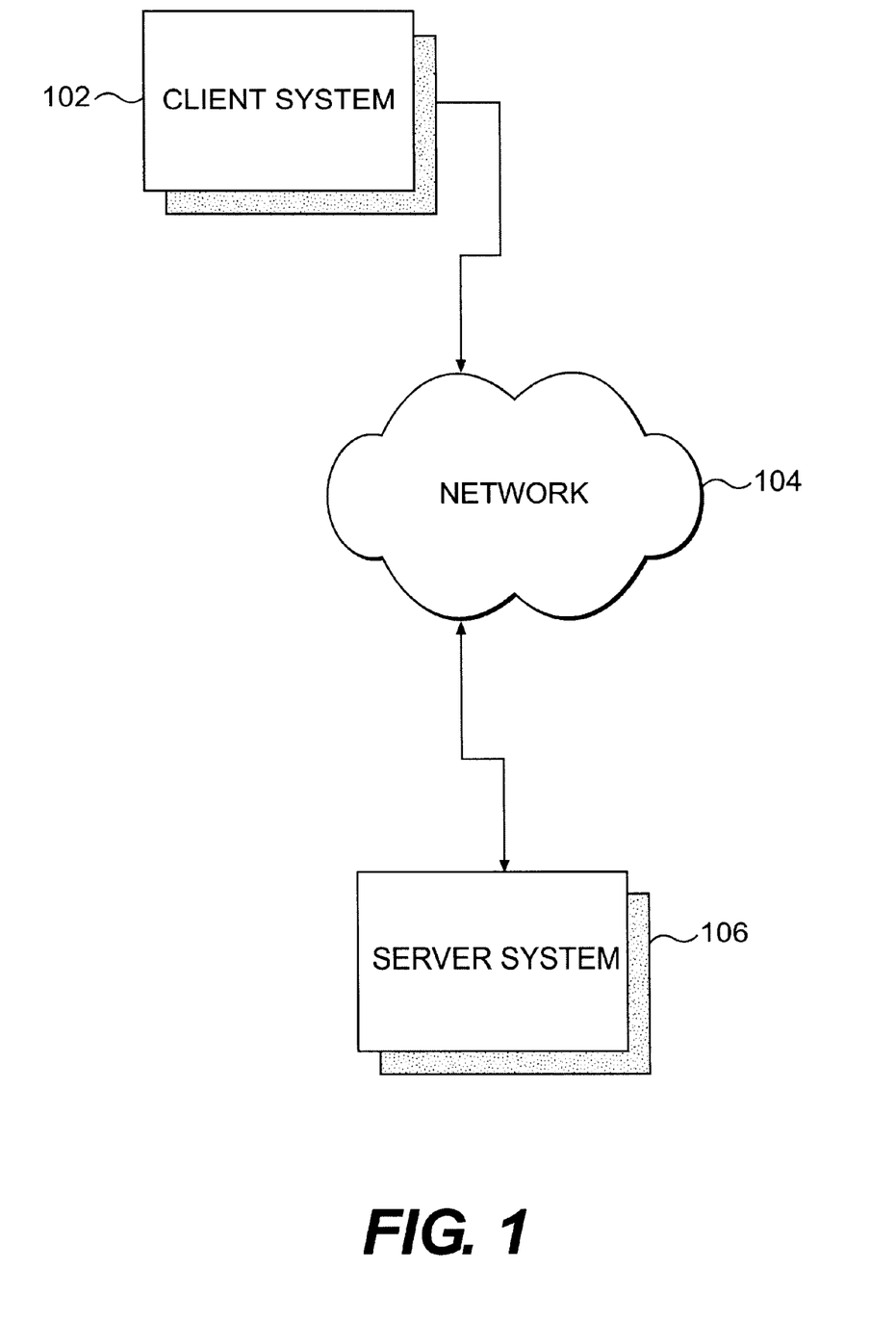
FIG. 1 depicts a block diagram of a network in which methods and systems consistent with the present invention may be implemented.

FIG. 1 is a block diagram of an exemplary network in which methods and systems consistent with the present invention may be implemented. A client system 102 and a server system 106 are connected together through network 104. A software application can execute on client system 102 and can access the contents of a document on client system 102 using one type of storage method. By replacing the storage method, the same software application can continue to execute on client system 102 but access the contents of the document on server system 106. In other implementations, storage methods having compression and other features can also be used to store the contents of a document.

Figure 2:
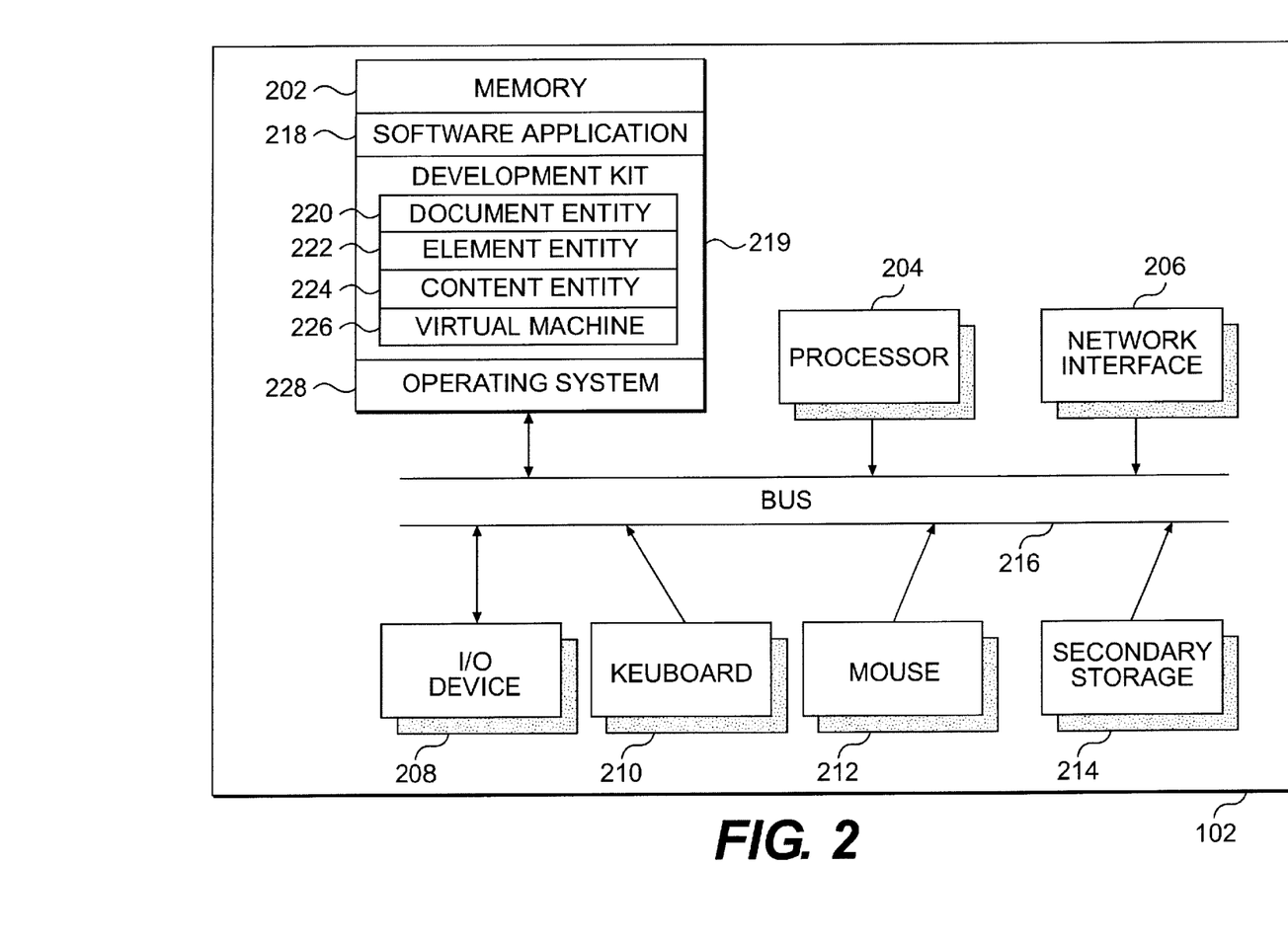
FIG. 2 depicts a block diagram of a data processing system in which methods and systems consistent with the present invention may be implemented.

FIG. 2 is block diagram of an exemplary data processing system with which methods and systems consistent with the present invention may be implemented. Computer system 102 includes a memory 202, a processor 204, a network interface 206, an input-output device 208, a keyboard 210, a mouse 212, a secondary storage 214, and a bus 216 which provides connectivity and communication among these subsystems. Network interface 206 can be connected to a network such as a Local Area Network (LAN), a Wide Area Network (WAN), or the Internet. Bus 216 may use a standard bus protocol.

Memory 202 includes a software application 218, a development kit (DK) 219, and an operating system 228. Software application 218 may be a business software application such as a text editor or spreadsheet, a software development tool, or other software application that uses a document with structured information. DK 219 provides libraries, subroutines, classes, drivers, and other software modules accessible to software application 218 using application programming interfaces (API).

For example, DK 219 may include a virtual machine 226 and classes used in an object-oriented programming language such as the Java™ programming language. Virtual machine 226 facilitates platform-independent data processing by simulating the operation of an abstract computing machine. Virtual machine 226 receives instructions for this abstract computing machine in the form of bytecodes. These bytecodes are interpreted and dynamically converted into a form for execution, such as object code, on processor 204. Essentially, bytecodes can be executed on any hardware platform having virtual machine 226. Java and the Java Virtual Machine and other derivatives of Java are trademarks of Sun Microsystems, Inc. and are provided as part of Sun Microsystems Java Development Kit.

A document entity 220, an element entity 222, and a content entity 224 designed in accordance with implementations of the present invention are also included in DK 219. These entities facilitate processing the storage of content of a document separately from processing associated with information reflecting the structure of content in the document. For example, content entity 226 stores content such as text for a text document or alphanumeric characters in a spreadsheet while document entity 220 uses element entity 222 to represent the structure of the text (content) in the text document or layout of alphanumeric characters (content) in a spreadsheet. As will be discussed below, these entities facilitate replacing storage methods in a software application to suit the application and computer system being used.

Modular Storage Method in a Software Application

Figure 3:
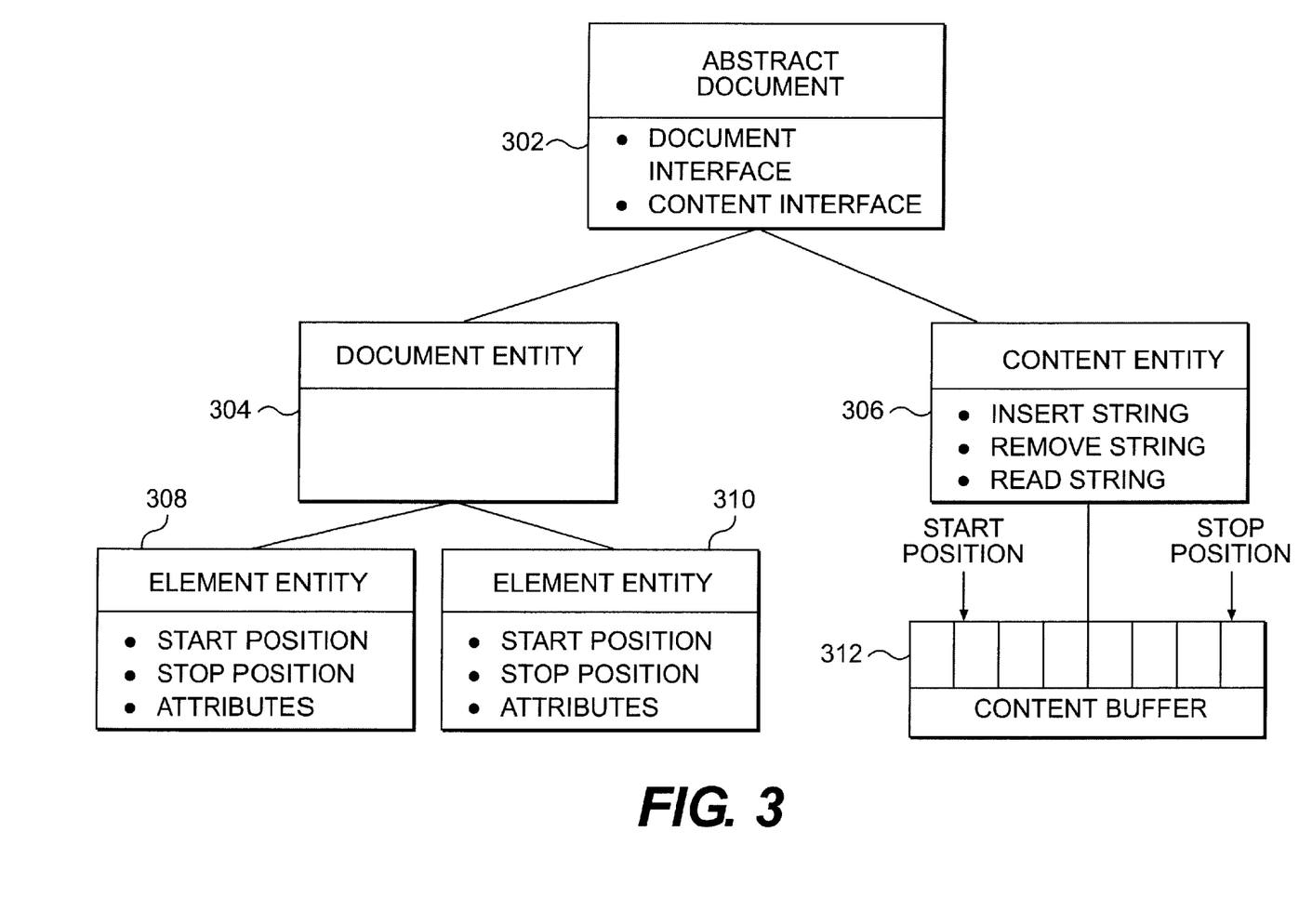
FIG. 3 depicts a block diagram of software entities implemented consistent with the present invention used to separate the process of storing content from the process of structuring content associated with structured text.

FIG. 3 is a block diagram of entities implemented consistent with the present invention used to separate the process of storing content from the process of structuring content in document. These entities include an abstract document 302, a document entity 304, a content entity 306, an element entity 308, an element entity 310, and a content buffer 312. In one implementation, these entities can be generated using an object-oriented programming language such as the Java programming language. Alternatively, these entities can be implemented using a procedural programming language such as C. These entities can also be implemented in firmware, hardware, application specific integrated circuits, and combinations thereof.

In an object-oriented implementation, abstract document 302 specifies the method names and corresponding parameters for accessing both the structure of content in a document and the content of a document. In particular, document interface in abstract document 302 defines the parameters used to access the structure of a document but leaves implementing this method to a subclass such as document entity 304. Similarly, content interface in abstract document 302 defines the parameters used to access the content of the document and leaves implementing the method to a subclass such as content entity 306. Software applications can gain access to the structure of a document and the contents of a document using these two respective interfaces.

Document entity 304 uses element entities 308 and 310 to describe the structure of a document. In an object-oriented language, document entity 304 implements the document interface in abstract document 302. Based on information in document entity 304, element entities can be arranged in a hierarchy to reflect the structure of a document. For example, element entity 308 and element entity 310 can be used to describe a text document having two paragraphs. Element entity 308 and element entity 310 may also be used to describe the structure of a text document having two sentences or two other elements in a text document.

The element entities include information used to access storage of content through content entity 306. Specifically, element entity 308 includes a start position, a stop position, and attributes associated with the text. The start and stop positions are used as indices into a storage area used by content entity 306. Attributes are used to describe details about formatting the content. For text content, formatting information may include attributes such as bold, underline, or italic. By identifying an index and not storing the actual content, storage methods associated with content entity 306 can be replaced without significant modifications to document entity 304, element entity 308, element entity 310, or other portions of a software application.

Content entity 306 provides access to content stored in a storage area such as content buffer 312. Operations used to manipulate the content in such a storage area include inserting string to add content, removing string to remove content, and reading string to access content. In this example, operations associated with content entity 306 are specifically designed to work with the way information is stored in content buffer 312.

Content buffer 312 is a storage area that stores content information as a series of alphanumeric characters. A start position and a stop position identify contents in content buffer 312. Each start and stop position corresponds to an element associated with document entity 304 such as element entity 308 or element entity 310.

Content entity 306 updates start and stop positions as content is added and removed from content buffer 312. For example, if content is added between the start position and the stop position then the stop position is advanced to indicate the increased content within an element. Because content entity 306 works with a particular storage area such as content buffer 312, replacing content buffer 312 with a new type of storage area also requires a new content entity to manipulate the stored information.

Methods of storing and organizing information in a sequence of storage locations such as content buffer 312 include conventional string manipulation and gap storage methods. Additional storage methods may also include memory-mapped files, piece-table storage, remote database storage over a network, and embedded document storage in several documents.

Replacing Storage Methods in a Software Application

Figure 4:
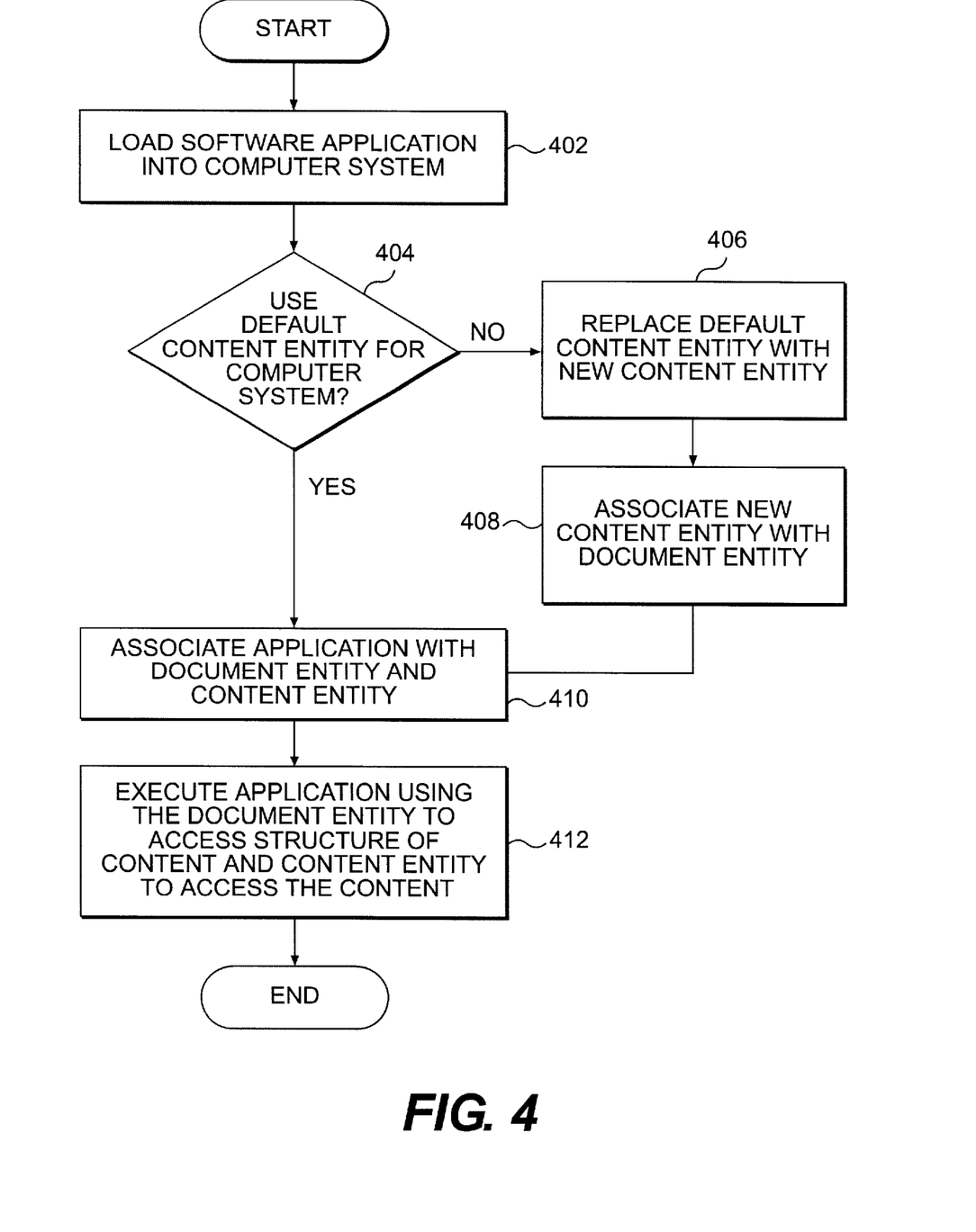
FIG. 4 depicts a flow chart of the operations used to replace a content entity for storing content consistent with one implementation of the present invention.

FIG. 4 is a flow chart of the operations used to replace a content entity for storing content consistent with one implementation of the present invention. Initially, a software application is loaded into a computer system (step 402). The software application can be any application that processes text or other information arranged according to a particular structure. The software application initially has a default content entity for managing the storage of text or other information. Loading the software application includes storing the application in memory or other storage area and preparing it for execution. Once the software application is loaded, a determination is made whether the default content entity should be used with the particular software application executing on the computer system (step 404). For this purpose a comparison is made between storage characteristics of numerous content entities against the available memory, processor capabilities, and disk storage associated with the computer system. For example, on a hand held computer system a content entity that provides remote storage and retrieval over a network may provide the appropriate storage solution. If the default content entity is not selected, a new content entity replaces the default content entity in the software application (step 406). As previously discussed, the content entity in a software application can be replaced without replacing the document entity used to arrange the structure of text or information in a document.

Next, the new content entity is associated with the existing document entity used to process the structure of text used in the document (step 408). At this point, the new content entity may receive information stored in the old content entity and convert it into a format compatible with the new content entity. This includes copying information between two storage areas as well as updating the start and stop positions for each element entity used in the document entity. Next, the software application is associated with both the document entity and content entity (step 410). This includes retrieving the structure of the document and retrieving the corresponding content associated with the structure. This information is then provided to the software application. For example, this may include retrieving the text information initially displayed on the computer screen of a text editor when the text editor begins editing a document. Next, the software application begins execution using the document entity to access the structure of content in a document and the content entity to access the content (step 412).

Figure 5:
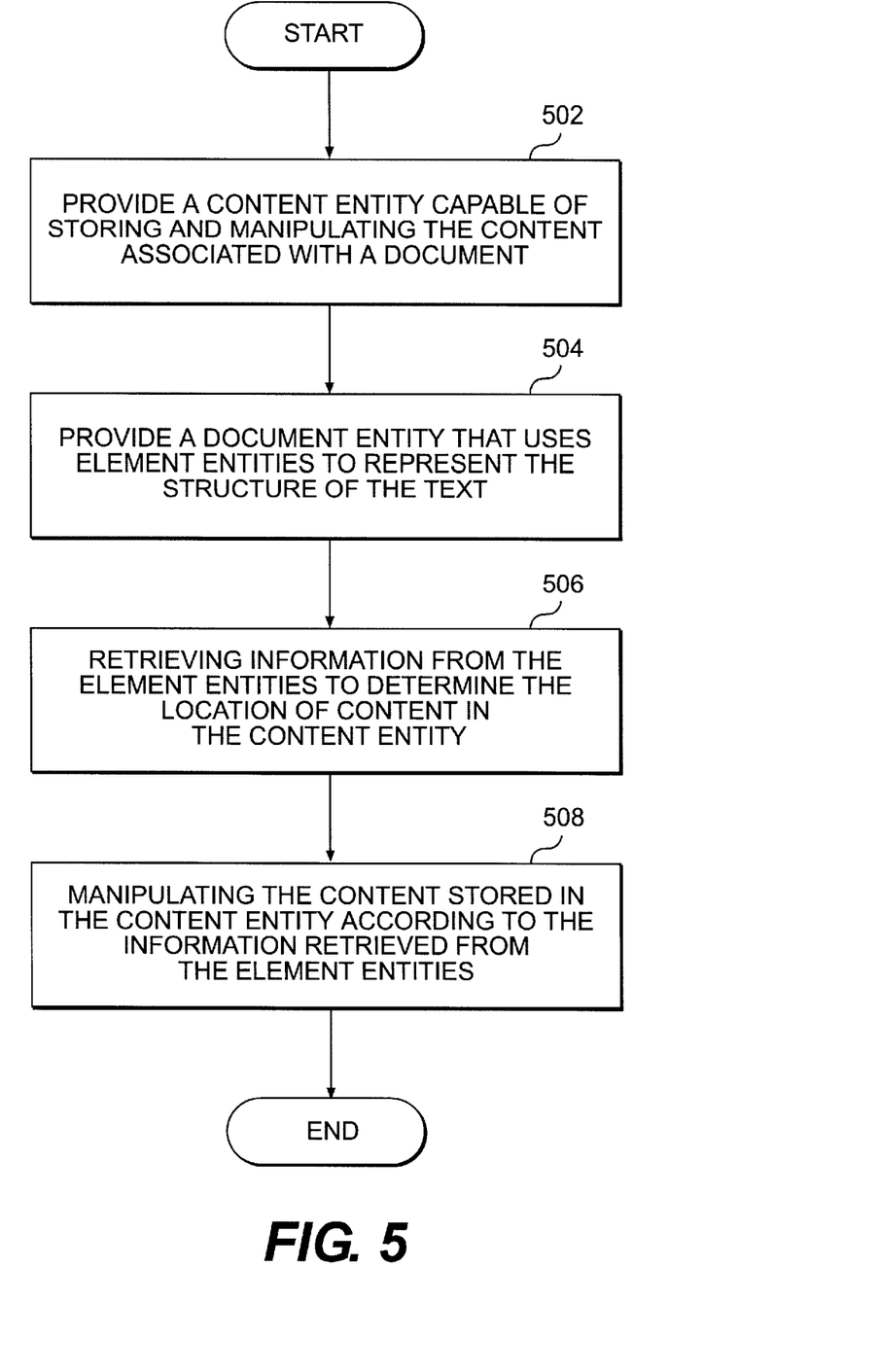
FIG. 5 depicts a flow chart of the operations for using software entities consistent with one implementation of the present invention to process the storage of content separately from the structure of content.

FIG. 5 is a flow chart of the operations for using software entities consistent with one implementation of the present invention to process the storage of content separately from the structure of content in a document. Initially, provision is made for a content entity capable of storing and manipulating the content associated with a document (step 502) and for a document entity that uses element entities to represent the structure of the content (step 504). For example, the document entity may create a hierarchy of element entities corresponding to a hierarchy of paragraphs, sentences, and characters in a document. Next, the software application retrieves information from the entity elements to determine the location of content in the content entity (step 506). For example, the software application may access an element entity to determine the start and stop positions of a particular paragraph in a document. This information retrieved from the element entities is then used to manipulate the content stored in the content entity (step 508). For example, the start position and stop position retrieved from an element entity may be used to access the content information stored in the content entity.

CONCLUSION

While specific implementations have been described herein for purposes of illustration, various modifications may be made without departing from the spirit and scope of the invention. For example, discussions of applying this invention to software applications such as text editors or spreadsheets can also apply to other software applications that process information arranged in a structure. Those skilled in the art understand that the present invention can be implemented in a wide variety of software platforms and is not limited to the Java programming language and development environment. Furthermore, although aspects of the present invention are described as being stored in memory and other storage mediums, one skilled in the art will appreciate that these aspects can also be stored on or read from other types of computer-readable media, such as secondary storage devices, like hard disks, floppy disks, or CD-ROM; a carrier wave from the Internet; or other forms of RAM or ROM. Accordingly, the invention is not limited to the above described embodiments, but instead is defined by the appended claims in light of their full scope of equivalents.

What is claimed is:

1. A method, executed on a data processor, of processing content of a document arranged in a structure, comprising:
    providing a content entity capable of storing and manipulating the content associated with the document without the structure of the content, wherein the manipulating further comprises,
        inserting content in the content entity to modify the document identified by a start position and a stop position,
        removing content from the content entity to modify the document, or
        retrieving content from the content entity wherein the retrieved content is subset of all content of the document;
    providing a document entity that uses element entities to represent the structure of the content without the actual content, further comprising,
    arranging the element entities in a hierarchy corresponding to the structure of the content in the document, and
    associating content in the content entity with element entities having a start position and a stop position in the document;
    retrieving information from the element entities to determine a location of particular content in the content entity, the particular content being a subset of all content of the document; and
    manipulating the content stored in a storage area associated with the content entity according to the information retrieved from the element entities.

2. A method, executed on a data processor, comprising:
    providing a content entity capable of storing and manipulating content of a document;
    providing a second entity reflecting a structure associated with the content of the document;
    retrieving information from the second entity identifying a location of particular content stored in the content entity, wherein the particular content is a subset of all of the content of the document; and
    inserting particular content in the content entity identified by a start position and a stop position that is included in the information retrieved from the second entity.

3. The method of claim 2 further comprising, removing the particular content from the content entity based on the information retrieved from the second entity.

4. The method of claim 2, wherein the inserting further comprises, retrieving the particular content from the content entity.

5. The method of claim 2, wherein providing the document entity further comprises,
    arranging element entities in a hierarchy corresponding to the structure associated with the content of the document; and
    associating content in the content entity with at least one of the element entities having the start position and the stop position.

6. A method, executed on a computer processor, for replacing a content entity used to store content in a document, comprising:
    loading a software application onto a computer system wherein the software application has a default content entity for storing content in a document;
    determining whether the default content entity should be used by the software application when executing on the computer system;
    replacing the default content entity with a new content entity depending on the determination; and
    associating the software application with a document entity that provides a structure of the content and the new content entity that provides the content associated with the document.

7. The method of claim 6, wherein the determining further comprises:
    identifying a storage capacity of the computer system; and
    comparing the storage capacity of the computer system with the storage characteristics provided by the default content entity and other content entities.

8. An apparatus configured to process the contents of a document arranged in a structure, comprising:
    a processor;
    a memory having instructions executable on the processor that provide a content entity capable of storing and manipulating the content associated with the document, provide a document entity that uses element entities to represent the structure of the content, retrieve information from the element entities to a location of content in the content entity, and insert particular content in the content entity identified by a start position and a stop position that is included in the information retrieved from the element entities.

9. An apparatus configured to replace a content entity used to store content in a document, comprising:
    a processor;
    a memory having instructions executable on the processor that loads a software application onto a computer system wherein the software application has a default content entity for storing content in a document, determines if the default content entity should be used by the software application when executing on the computer system, replaces the default content entity with a new content entity depending on the determination, and associates the software application with a document entity that provides a structure of the content and the new content entity that provides the content associated with the document.

10. An apparatus for processing the contents of a document arranged in a structure, comprising:
    means for providing a content entity capable of storing and manipulating the content associated with the document;
    means for providing a document entity that uses element entities to represent the structure of the content;
    means for retrieving information from the element entities to determine a location of content in the content entity; and means for inserting particular content in the content entity identified by a start position and a stop position that is included in the information retrieved from the element entities.

11. An apparatus for replacing a content entity used to store content in a document comprising:

means for loading a software application onto a computer system wherein the software application has a default content entity for storing content in a document;

means for determining if the default content entity should be used by the software application when executing on the computer system;

means for replacing the default content entity with a new content entity depending on the determination; and means for associating the software application with a document entity that provides a structure of the content and the new content entity that provides the content associated with the document.

12. A method, executed on a computer processor, for replacing a content entity used to store content in a document, comprising:

loading onto a computer system a software application that has a default content entity for storing content in a document;

determining whether the default content entity should be used by the software application when executing on the computer system based on a storage characteristic associated with the computer system;

replacing the default content entity with a new content entity depending on the determination; and associating the software application with a document entity that provides a structure of the content and the new content entity that provides the content associated with the document.

* * * * *

UNITED STATES PATENT AND TRADEMARK OFFICE
CERTIFICATE OF CORRECTION

PATENT NO. : 6,592,628 B1
DATED : July 15, 2003
INVENTOR(S) : Timothy N. Prinzing It is certified that error appears in the above-identified patent and that said Letters Patent is hereby corrected as shown below:

<u>Column 7,</u>
Line 32, after "content is" and before "subset", insert -- a --.

Signed and Sealed this

Seventh Day of October, 2003

JAMES E. ROGAN
*Director of the United States Patent and Trademark Office*